US008068455B2

(12) United States Patent
Utsunomiya et al.

(10) Patent No.: US 8,068,455 B2
(45) Date of Patent: Nov. 29, 2011

(54) RADIO COMMUNICATION APPARATUS AND RADIO COMMUNICATION METHOD

(75) Inventors: Yoriko Utsunomiya, Tokyo (JP); Tomoko Adachi, Urayasu (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 822 days.

(21) Appl. No.: 12/027,606

(22) Filed: Feb. 7, 2008

(65) Prior Publication Data

US 2008/0192644 A1 Aug. 14, 2008

(30) Foreign Application Priority Data

Feb. 8, 2007 (JP) ................................ 2007-029400

(51) Int. Cl.
*H04W 4/00* (2009.01)
(52) U.S. Cl. ........................ 370/329; 370/443
(58) Field of Classification Search .................. 370/201, 370/328–329, 330–332, 343, 345, 347–348, 370/432, 437, 442–443, 445
See application file for complete search history.

(56) References Cited

U.S. PATENT DOCUMENTS

| | | | | |
|---|---|---|---|---|
| 6,519,462 | B1 * | 2/2003 | Lu et al. ...................... | 455/453 |
| 7,236,782 | B2 | 6/2007 | Utsunomiya et al. | |
| 7,660,229 | B2 * | 2/2010 | Papasakellariou et al. ... | 370/203 |
| 7,801,490 | B1 * | 9/2010 | Scherzer ..................... | 455/67.13 |
| 2003/0086371 | A1 * | 5/2003 | Walton et al. ................ | 370/235 |
| 2006/0159003 | A1 | 7/2006 | Nanda et al. | |
| 2006/0286935 | A1 | 12/2006 | Utsunomiya et al. | |
| 2007/0026806 | A1 * | 2/2007 | Kuroda et al. ............... | 455/63.3 |
| 2007/0133473 | A1 | 6/2007 | Takagi et al. | |
| 2007/0232303 | A1 | 10/2007 | Utsunomiya et al. | |
| 2008/0069275 | A1 * | 3/2008 | Horiguchi et al. ............. | 375/347 |
| 2008/0151849 | A1 * | 6/2008 | Utsunomiya et al. .......... | 370/338 |
| 2008/0153553 | A1 * | 6/2008 | Horiguchi et al. ............. | 455/567 |
| 2008/0253347 | A1 * | 10/2008 | Cordeiro et al. .............. | 370/343 |
| 2010/0027513 | A1 * | 2/2010 | Ikeda ............................ | 370/337 |

FOREIGN PATENT DOCUMENTS

| | | |
|---|---|---|
| JP | 2004-64613 | 2/2004 |
| JP | 2006-129247 | 5/2006 |
| WO | WO 2006/045097 A2 | 4/2006 |

(Continued)

OTHER PUBLICATIONS

U.S. Appl. No. 11/855,604, filed Sep. 14, 2007, Toshihisa Nabetani, et al.

(Continued)

*Primary Examiner* — Kevin Mew
(74) *Attorney, Agent, or Firm* — Oblon, Spivak, McClelland, Maier & Neustadt, L.L.P.

(57) ABSTRACT

A radio communication apparatus that performs first radio communication using a first channel among two first channels each having a first channel width, and second radio communication using a second channel having a second channel width that is wider than the first channel width and also having a channel width overlapping with the two first channels. The apparatus includes an interference detection device which detects that interference occurs in the first channel among the two first channels, and a frame generation unit which generates a notification frame that recommends the use of only the first channel width. An instruction unit instructs the frame generation unit to generate the notification frame when the occurrence of interference is detected by the interference detection device. A frame transmission unit transmits the notification frame generated from the frame generation unit in response to the instruction from the instruction unit.

9 Claims, 12 Drawing Sheets

FOREIGN PATENT DOCUMENTS

WO     WO 2006/110404 A2     10/2006

OTHER PUBLICATIONS

U.S. Appl. No. 11/857,841, filed Sep. 19, 2007, Yoriko Utsunomiya, et al.

U.S. Appl. No. 11/894,157, filed Aug. 20, 2007, Unknown.

Yoriko Utsunomiya, et al., "A MAC Protocol for Coexistence between 20/40 MHz STAs for High Throughput WLAN", VTC 2006 spring, IEEE Vehicular Technology Conference, May 2006, IEICE Transactions on Communications, vol. J89-B, No. 2, 5 Pages.

"Draft Standard for Information Technology—Telecommunications and information exchange between systems—Local and metropolitan area networks—Part 11: Wireless LAN Medium Access Control (MAC) and Physical Layer (PHY) specifications: Amendment <Number>: Enhancements for Higher Throughput," IEEE P802.11n ™/D2.00, Feb. 2007, pp. i-xxiv and 1-476.

\* cited by examiner

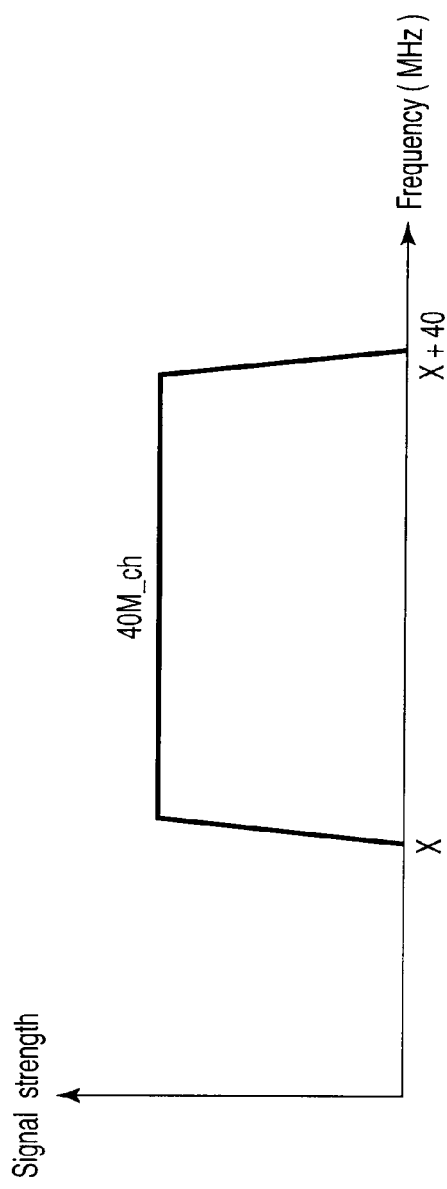
F I G. 2 A
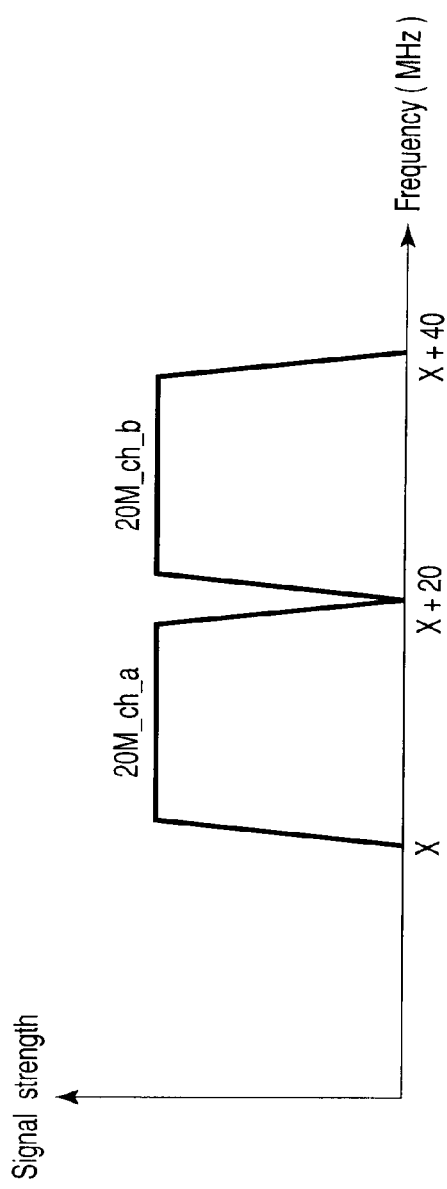
F I G. 2 B

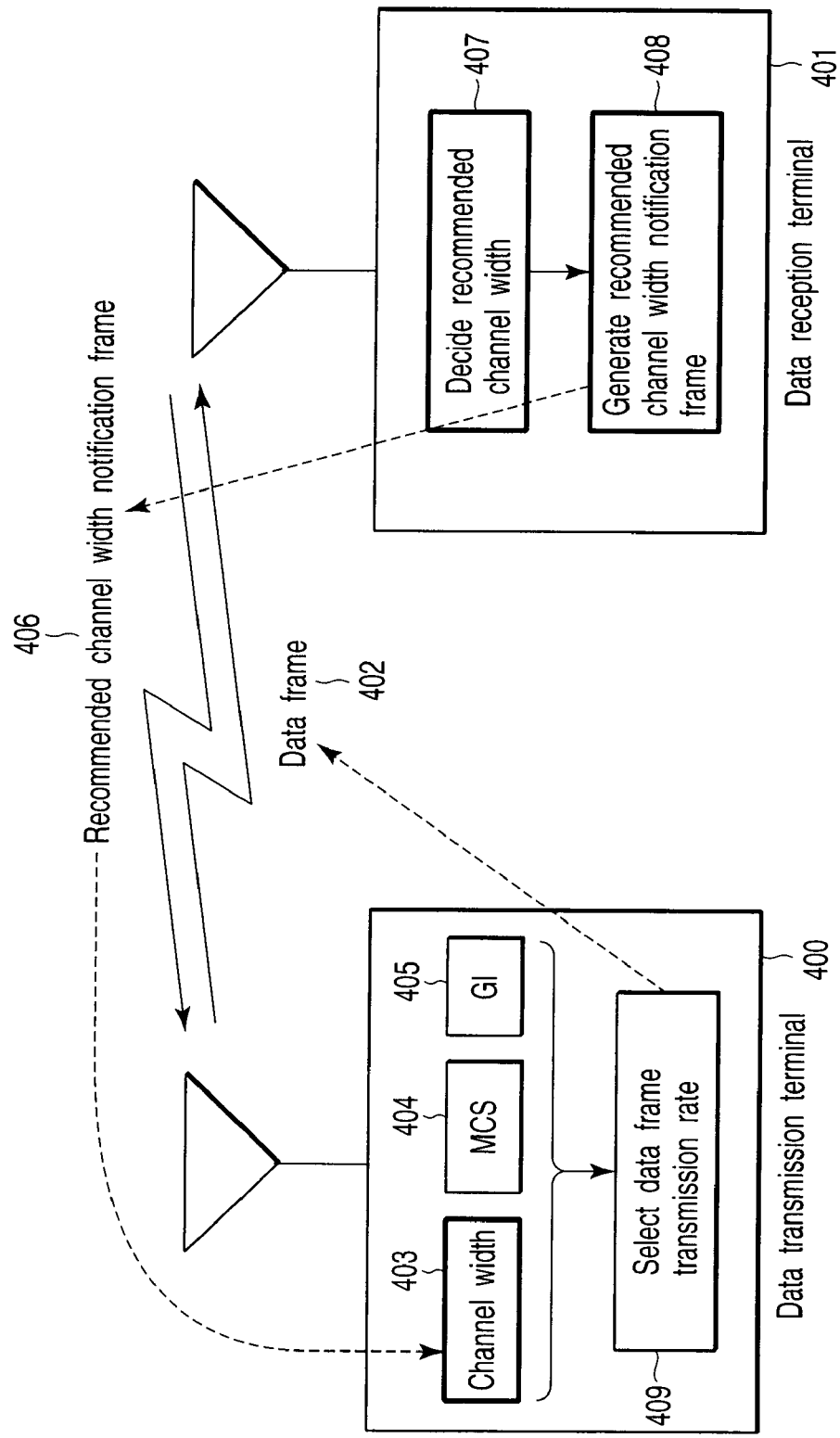
F I G. 4

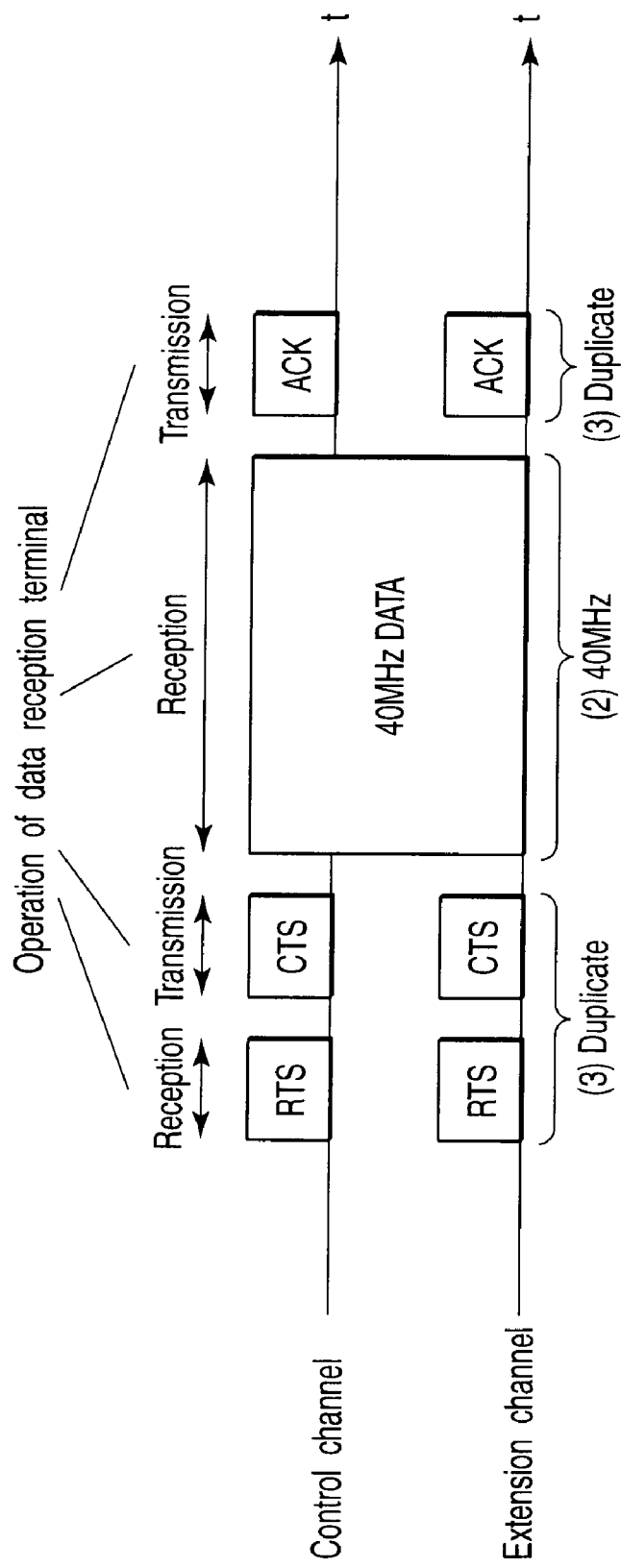
F I G. 8

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Application No. 2007-029400, filed Feb. 8, 2007, the entire contents of which are incorporated herein by reference.

BACKGROUND OF THE INVENTION

1. Field of the Invention

The present invention relates to a radio communication apparatus and a radio communication method for performing media access control on the basis of a carrier sense state.

2. Description of the Related Art

In recent years, wireless local area networks (LANs) have become rapidly and widely used in environments ranging from offices to homes, as well as for hot-spot services in public places. Although standards such as IEEE802.11a, which uses a 5 GHz band, and IEEE802.11b/g, which uses a 2.4 GHz band have become mainstream, IEEE802.11e, which extends the Quality of Service (QoS) function to a medium access control (MAC) layer on IEEE802.11a/b/g has also been established as a standard. Presently, standardization activity of IEEE802.11n, which extends both the physical and MAC layers, has been advanced so as to establish effective throughput of 100 Mbps or more.

As regards IEEE802.11n, a method for extending the communication band is proposed as one approach to increase the transmission rate. Conventionally, while a transmission channel width of one channel to be used in an IEEE802.11 wireless LAN system is 20 MHz, the proposed method intends to achieve a 40 MHz band communication having a double-wide transmission channel width by using two channels of the transmission channel width of 20 MHz at the same time. For instance, according to an IEEE802 11n Working Group, "Draft Amendment to STANDARD [FOR] Information Technology-Telecommunications and information exchange between systems-Local and Metropolitan networks-Specific requirements-Part II: Wireless LAN Medium Access Control and Physical Layer specifications: Enhancements for Higher Throughput," IEEE P802.11n™/D1.0, January 2006, IEEE802.11n uses adjacent channels each having a 20 MHz transmission channel width by bundling them, which enables 40 MHz band communication. One of the two channels is called 'a control channel' or 'a primary channel', and is utilized to exchange not only data but also control information for 20 MHz communication and basic service set (BSS) management. The other channel is called 'an extension channel' or 'a secondary channel', and used as a channel to extend the band in performing 40 MHz communication. The extension channel may be used by another system, a BSS of a wireless LAN, or more specifically, a wireless LAN using only the 20 MHz band, such as IEEE802.11/a/b/g. A data frame transmitted by using the channel width of 40 MHz could be received incorrectly at a destination terminal because of interference from other system or BSS of the wireless LAN existing on the extension channel. A throughput performance of the BSS in such a case is disclosed, for example, in Yoriko Utsunomiya, Tomoya Tandai, Tomoko Adachi, Masahiro Takagi, 'A MAC Proposal to IEEE802.11n High Throughput WLAN for 20/40 MHz Coexistence', IEICE Transactions on Communications, vol. J89-B, No. 2, February, 2006.

A method for switching a channel of a BSS to another channel or using only the 20 MHz band with the control channel is described, for example, in the specification of USA Pat. Appln. Publication No. 2006-0159003. Thus, if an interference level from other systems or wireless LAN existing on the extension channel is high, transmitting the frames by using only the control channel of 20 MHz could achieve less frame error rate and higher throughput than that using 40 MHz.

A terminal compliant with IEEE802.11n standards and having a 40 MHz communication capability may select either the transmission channel width of 20 MHz or the transmission channel width of 40 MHz for each frame. According to the IEEE802.11n Working Group, "Draft Amendment to STANDARD [FOR] Information Technology-Telecommunications and information exchange between systems-Local and Metropolitan networks-Specific requirements-Part II: Wireless LAN Medium Access Control and Physical Layer specifications: Enhancements for Higher Throughput," IEEE P802.11n™/D1.0, January 2006, IEEE802.11n defines 'Recommended Transmission Channel Width Action frame' (hereinafter referred to as 'a recommended channel width notification frame') so that a terminal decides a transmission channel width. This is a frame to indicate the channel width (20 MHz or 40 MHz) which with a terminal wants other terminal to transmit. The recommended channel width may be specified for each partner terminal. A terminal to transmit the data frame may decide the transmission channel width on the basis of the recommended channel width described in a recommended channel width notification frame received from the partner terminal.

However, an algorithm to generate and transmit the recommended channel width notification frame at each terminal is not defined in IEEE802.11n. Especially, when the recommended channel width notification frame is transmitted and which channel width should be recommended.

As an example of the algorithm, a terminal may recommend the channel width which corresponds to its terminal capability by transmitting the recommended channel width notification frame. However, if the other terminals decide the transmission channel width on the basis of the recommended channel width frame transmitted in accordance with the terminal capability, under the environment in which the other system or BSS of the wireless LAN exists on the extension channel, the other terminals may transmit 40 MHz frame to the terminal even in a channel state which the terminal cannot receive the 40 MHz frame because of interference. Also, when the selection of channel width to recommend is not appropriate, the same thing would occur.

Thus, a problem, such that the frequency resource of the BSS is wasted and a transmission terminal wastes transmission power, is caused. Accordingly, to avoid such a problem, it is necessary a method by which the data reception terminal notifies of an appropriate channel width in the recommended channel width notification frame.

BRIEF SUMMARY OF THE INVENTION

According to an aspect of the present invention, there is provided a radio communication apparatus that performs first radio communication using one first channel among two first channels each having a first channel width, and a second radio communication using second channel having a second channel width that is wider than the first channel width and also having a channel width overlapping with the two first channels, comprising: an interference detection device configured to detect that an interference occurs in one first channel among the two first channels; a frame generation unit which generates a notification frame to recommend for using only the first channel width; an instruction unit which instructs the frame generation unit to generate the notification frame when the occurrence of interference is detected by the interference detection device; and a frame transmission unit which transmits the notification frame generated from the frame generation unit in response to the instruction from the instruction unit.

BRIEF DESCRIPTION OF THE SEVERAL VIEWS OF THE DRAWING

FIG. 2A is a schematic view of a channel to be used in the radio communication system;

FIG. 2B is another schematic view of a channel to be used in the radio communication system;

FIG. 4 is a view for explaining a decision of a transmission channel width;

FIG. 8 is a view illustrating an example of transmissions of a 40 MHz data frame;

DETAILED DESCRIPTION OF THE INVENTION

As regards a system in which a terminal transmits frames by means of concentrated control, a radio LAN system based on IEEE Std. 802.11-1999 (revision 2003 includes ISO/IEC 8802-11:1999(E) ANSI/IEEE Std. 802.11, 1999 edition, IEEE Std. 802.11a-1999, IEEE Std. 802.11b-1999, IEEE Std. 802.11b-1999/Cor 1-2001 and IEEE Std. 802.11-2001) will be described. The following will describe a basic system configuration on the basis of an IEEE 802.11 wireless LAN system. IEEE 802.11 standards are standards related to a physical (PHY) layer and a medium access control (MAC) layer. Hereinafter, the system configuration will be described mainly regarding the processing in a MAC layer. The IEEE 802.11 standards described hereinafter include standards to be positioned as amendments and recommended practices of IEEE 802.11 standards.

FIRST EMBODIMENT

Figure 1:
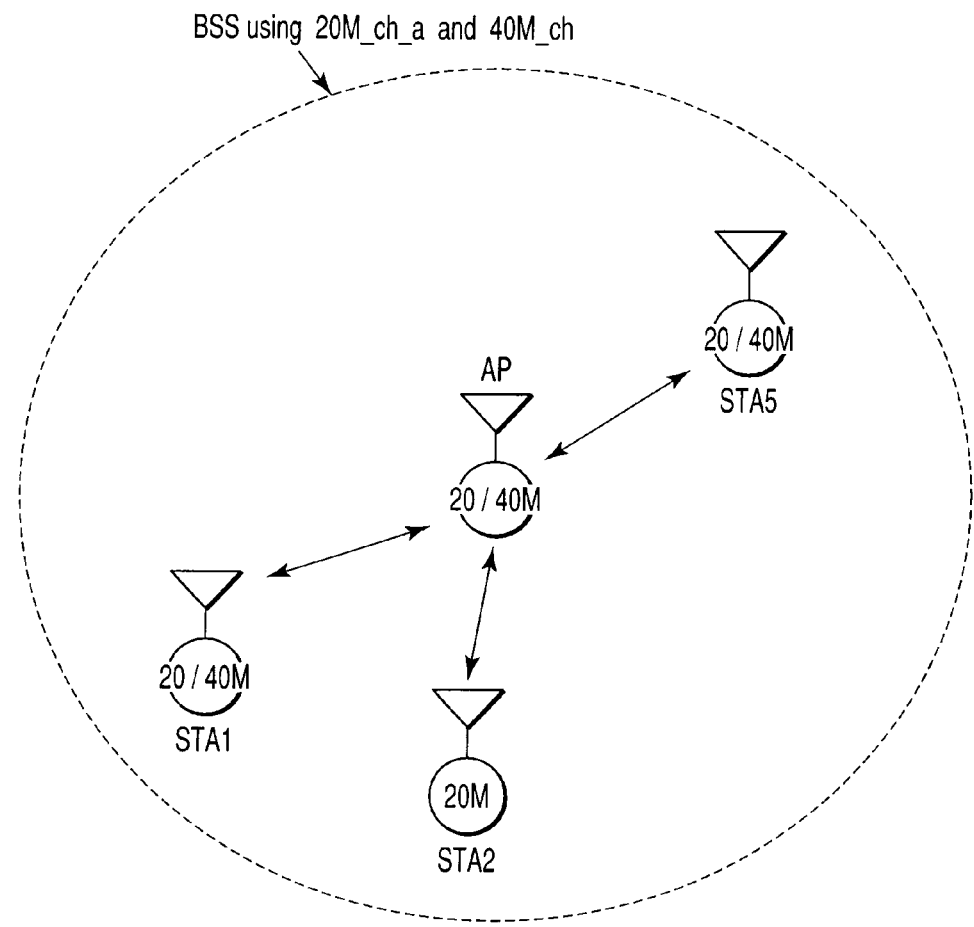
FIG. 1 is a view illustrating an example of a radio communication system regarding an embodiment.

FIG. 1 shows an example of a radio communication system regarding the first embodiment of the invention. Here, three radio terminals (STA1, STA2, and STA5) are connected to one access point (AP) which forms one basic service set (BSS). The AP intensively manages the BSS.

Within the BSS, the system uses two kinds of channels differing in frequency channel width to transmit and receive frames. The two kinds of channels are namely a first channel, with a first communication channel width, and a second channel, with a second communication channel width. In the first embodiment, the first communication channel width is set to 20 MHz and the second communication channel width is set to 40 MHz.

The AP, the STA1 and the STA5 in FIG. 1 correspond to the channel widths of both the 20 MHz and 40 MHz, and these terminals may transmit and receive the frames by using either a channel 40M_ch or a channel 20M_ch_a. The STA2 is a terminal corresponding only to the channel width of 20 MHz and only performs the transmissions and receptions using the channel 20M_ch_a. It goes without saying that the number of radio terminals and the number for each type of the terminals to be connected to the AP are not limited to specific numbers. For instance, a system without the STA2 and only with the 20/40 MHz terminals is a possible approach.

Figure 3:
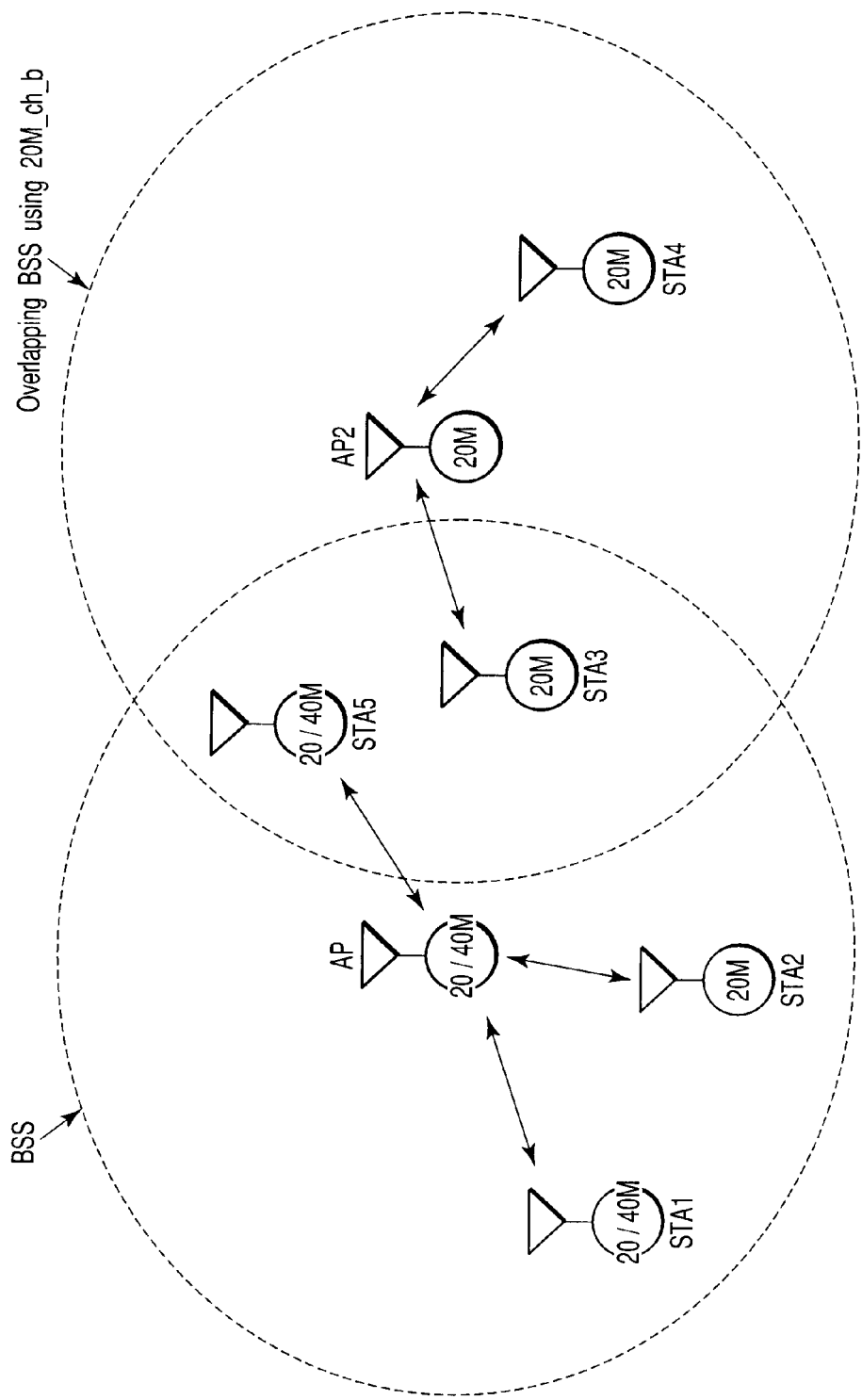
FIG. 3 is a view illustrating an example of another radio communication system regarding the embodiment.

FIGS. 2A, 2B show schematic views of channels, respectively. FIG. 2B shows a channel 20M_ch_a of 20 MHz using a frequency band of X MHz to (X+20) MHz, and FIG. 2A shows a channel 40M_ch of 40 MHz using a frequency band of X MHz to (X+40) MHz. Therefore, the frequency band of X MHz to (X+20) MHz is used in an overlapped manner for the channels of 20 MHz and 40 MHz. Within the BSS, the system calls the channel 20M_ch_a as 'a control channel' and uses it for the exchange of control information for the 20 MHz communication and the BSS management. Another channel 20M_ch_b of 20 MHz using the frequency band of (X+20) MHz to (X+40) MHz forms the channel 40M_ch together with the channel 20M_ch_a. The system calls the channel 20M_ch_b 'an extension channel' within the BSS. The channel 20M_ch_b is not independently used for a 20 MHz communication of the BSS in FIG. 2, but it may be used for other systems or other BSSs, as shown in FIG. 3. Especially, the BSS that uses only the MHz band, such as IEEE802.11/a/b/g, may sometimes use the channel 20M_ch_b.

In FIG. 2B, the position of the channel 20M_ch_a and 20M_ch_b could be switched. That means the channel 20M_ch_a of 20 MHz may use a frequency band of (X+20) MHz to (X+40) MHz, and the channel 20M_ch_b of 20 MHz may use a frequency band of X MHz to (X+20) MHz.

FIG. 3 shows an aspect in which two BSSs are overlapped to each other. The BSS on the left side of FIG. 3 is same as the BSS in FIG. 1, the AP, STA1 and STA5 respond to both the channel widths of 20 and 40 MHz, uses a control channel for the 20 MHz communication, and uses both the control channel and the extension channel for the 40 MHz communication. The STA2 is the terminal responding only to the 20 MHz band, and performs communication only using the control channel. On the contrary, the BSS positioned on the right side of FIG. 3 consists of an AP2, a STA3 and a STA4 responding to only the 20 MHz band and performs 20 MHz communications using only the extension channel. Since both the BSSs are overlapped on the extension channel, it is necessary for the BSSs to use a medium while sharing it.

In a BSS in FIG. 3, before transmitting a data frame, the AP, STA1 and STA5 decide the transmission channel width in accordance with the recommended transmission channel width from a partner terminal. Each of the terminals notifies recommended transmission channel widths to other terminals. To notify the recommended transmission channel widths, 'a recommended transmission channel width action frame' (recommended channel width notification frame) may be used. This is a frame which notifies the channel width (20 MHz or 40 MHz) desired to be used in transmitting the data toward the self-terminal, and described either information of 'use only 20 MHz (20 MHz recommendation)' or 'may use either band of 20 MHz and 40 MHz (40 MHz recommended)' therein. The frame may notify the identical recommended transmission channel widths to all other terminals by using a broadcast transmission, and may notify different recommended transmission channel widths for each terminal by using a unicast transmission.

For instance, the STA1 in FIG. 3 may broadcast the recommended channel width frames with 'any band of 20 MHz and 40 MHz may be used' described therein to notify the recommended transmission channel widths to all terminals in the BSS, or may unicast-transmit the recommended channel width frames with the identical 'any band of 20 MHz and 40 MHz may be used' described therein to notify the recommended transmission channel widths to the AP and the STA5, respectively. The STA1 may notify different recommended transmission channel widths for each terminal, in a manner such that unicast-transmits the recommended channel width frame with 'any band of 20 MHz and 40 MHz may be used' described therein to the AP, and in a manner such that unicast-transmits the recommended channel width frame with 'only 20 MHz may be used' described therein to the STA5.

The terminal decides the transmission channel width on the basis of the recommended channel width in the recommended channel width notification frame from the destination terminal before transmitting the data frame.

Referring now to FIG. 4, the decision of the transmission channel width will be described. A data transmission terminal 400 and a data reception terminal 401 in FIG. 4 may be any one of the AP and the STAs. Both the terminals are STAs is the possible case (e.g., in using an IBSS mode). When transmitting a data frame 402, or before transmitting the data frame 402, the data transmission terminal 400 decides a transmission channel width 403, a modulation and coding scheme (MCS) 404 and type of guard interval (GI) 405. Thereby, a transmission rate is calculated and the data frame 402 is transmitted with this transmission rate.

Meanwhile, the data reception terminal 401 decides a recommended channel width which is desired to be used by the data transmission terminal 400, and describes it in a recommended channel width notification frame 406 to transmit it to the data transmission terminal 400. Hereinafter, a method for issuing the notification frame 406 in the reception terminal 401, especially what trigger is used to generate the frame 406 and which channel bandwidth is selected 20M_ch or 40M_ch, will be described.

Figure 5:
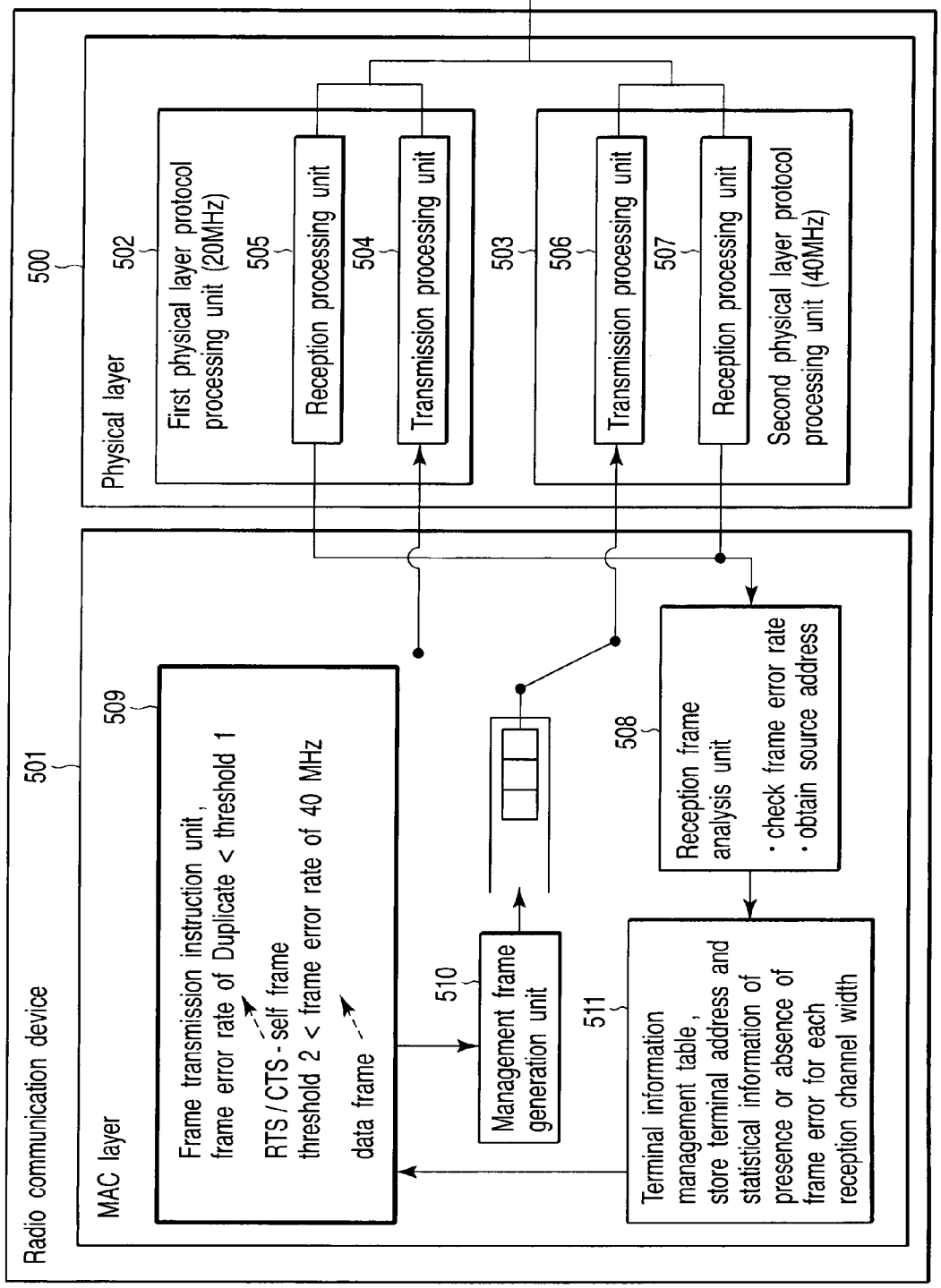
FIG. 5 is a block diagram illustrating a radio communication apparatus regarding the first embodiment.

FIG. 5 shows a block diagram of the radio communication apparatus regarding the first embodiment. Here, the radio communication apparatus shown in FIG. 5 is set as a 20/40 MHz AP or a 20/40 MHz STA. The 20/40 MHz AP and the 20/40 MHz STA each include a physical layer 500 and a MAC layer 501, as shown in FIG. 5.

The physical layer 500 includes a first physical protocol processing unit 502 performing physical layer protocol processing so as to make communication through a first channel with a first communication channel width, and a second physical protocol processing 503 so as to make communication through a second channel with a wider second communication channel width than that of the first communication channel width.

The processing units 502 and 503 differ in frequency channel width of channels to be used. In the first embodiment, it is assumed that the processing unit 502 is a signal processing unit performing physical layer signal processing for the 20 MHz transmission channel communication, and the processing unit 503 is a signal processing unit performing physical layer signal processing for the 40 MHz transmission channel width communication. The processing units 502 and 503 frequently share a circuit when actually mounted, they are not always independent from each other as shown in FIG. 5. One first channel is set as a control channel (or, a primary channel), and the other first channel is set as an extension channel (or a secondary channel) among a plurality of first channels each having the first communication channel width that performs signal processing by the first processing unit 502, and is used for the following descriptions. The control channel is used for the exchange of control information for the 20 MHz communication and the BSS management, and the extension channel is used for the channel to extend the channel width in 40 MHz communication.

The first processing unit 502 includes a transmission processing unit 504 and a reception processing unit 505. The protocol to be processed by the first processing unit 502 includes, for example, at least a physical layer protocol defined in IEEE802.11a. In the first embodiment, the first communication channel width to be used by the first processing unit 502 is 20 MHz, as given above. The first processing unit 502 may employ a so-called multiple input multiple output (MIMO) technique which each uses a plurality of antennas on a transmission side and a reception side.

It is assumed that the second physical layer protocol processing unit 503 employs either a technique of single input single output (SISO) or a technique of MIMO, or both techniques. Here, the second communication channel width to be used by the second processing unit 503 is 40 MHz, as given above. The first communication channel width is within the limit of the second communication channel width.

A reception processing unit 505 of the first processing unit 502 and a reception processing unit 507 of the second processing unit 503 determine a reception channel width and transfers it to the MAC layer 501. For determining the reception channel width, the first and the second processing units 502 and 503 may cooperate with each other. In the case of the wireless LAN compliant with IEEE802.11n, it is considered that a first to a third channel width modes, more specifically, '20 MHz', '40 MHz' and 'Duplicate' are the reception channel widths.

Figure 6:
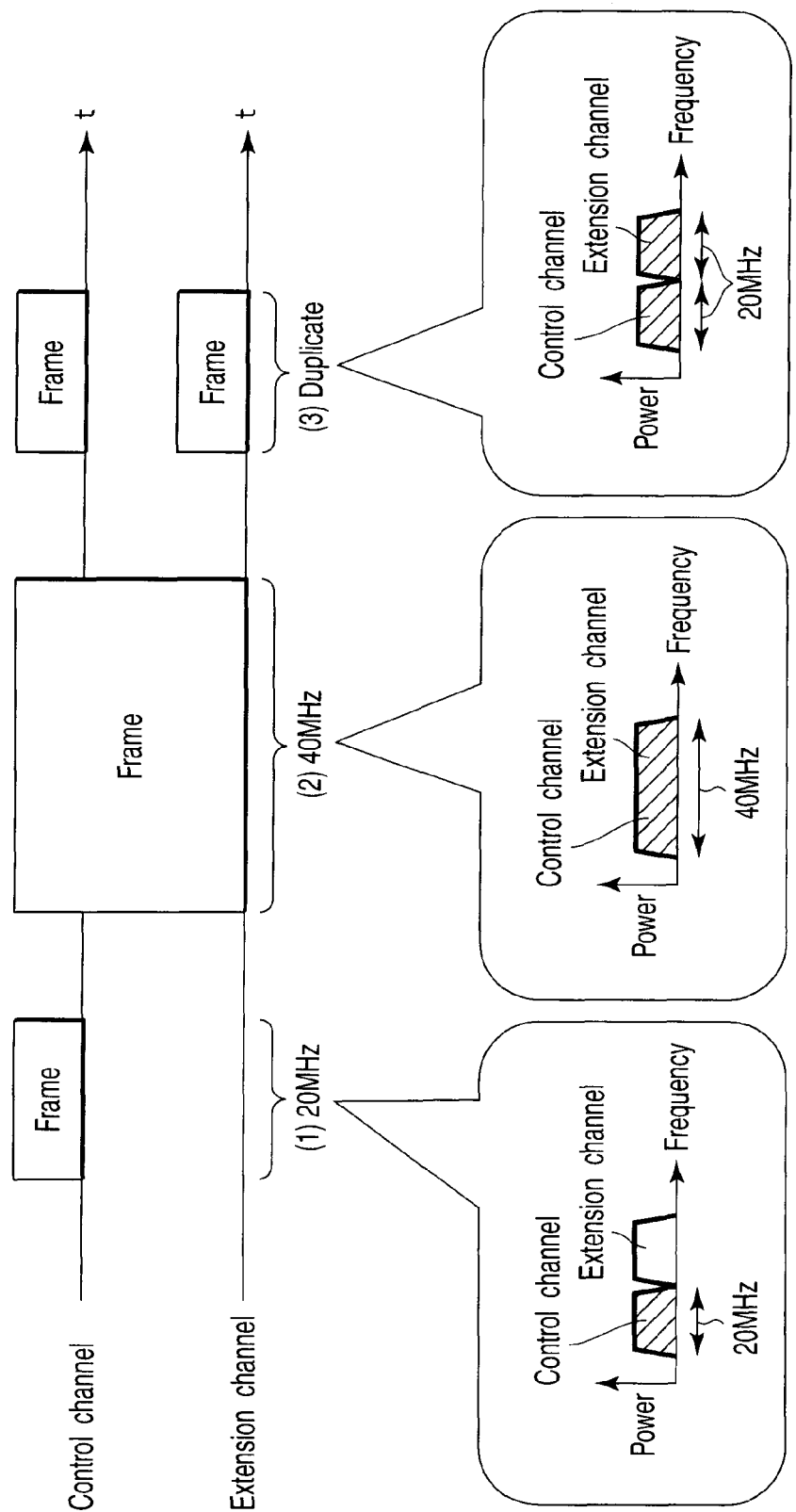
FIG. 6 is a view illustrating a use method of a frequency channel and an aspect of a frame transmission.

FIG. 6 shows a method for using a frequency channel in each channel width and an aspect of a frame transmission.

The first channel width mode '20 MHz' is determined in the following manner. The transmission terminal uses only the control channel and transmits one frame with the channel width of 20 MHz. When receiving a signal only through the control channel of 20 MHz, the physical layer 500 of the reception terminal determines that the reception channel width is the first channel width mode '20 MHz' and transmits this fact to the MAC layer 501.

The second channel width mode '40 MHz' is determined in the following manner. The transmission terminal transmits one frame through the channel width of 40 MHz by bundling and using the channel widths of the control channel and the extension channel. When receiving a signal through the channel width of 40 MHz in which the control channel and the extension channel are put together, the physical layer 500 of the reception terminal determines that the reception channel width is in the second channel width mode '40 MHz' and transmits this fact to the MAC layer 501.

The third channel width mode 'Duplicate' is determined in the following manner. The transmission terminal uses the control channel and the extension channel and simultaneously transmits two frames mutually having identical contents with each channel width of 20 MHz. When simultaneously receiving the same signal of 20 MHz on the control channel and the extension channel, the physical layer 500 of the reception terminal determines that the reception channel width is in the third channel width mode 'Duplicate' and transmits this fact to the MAC layer 501.

Figure 7:
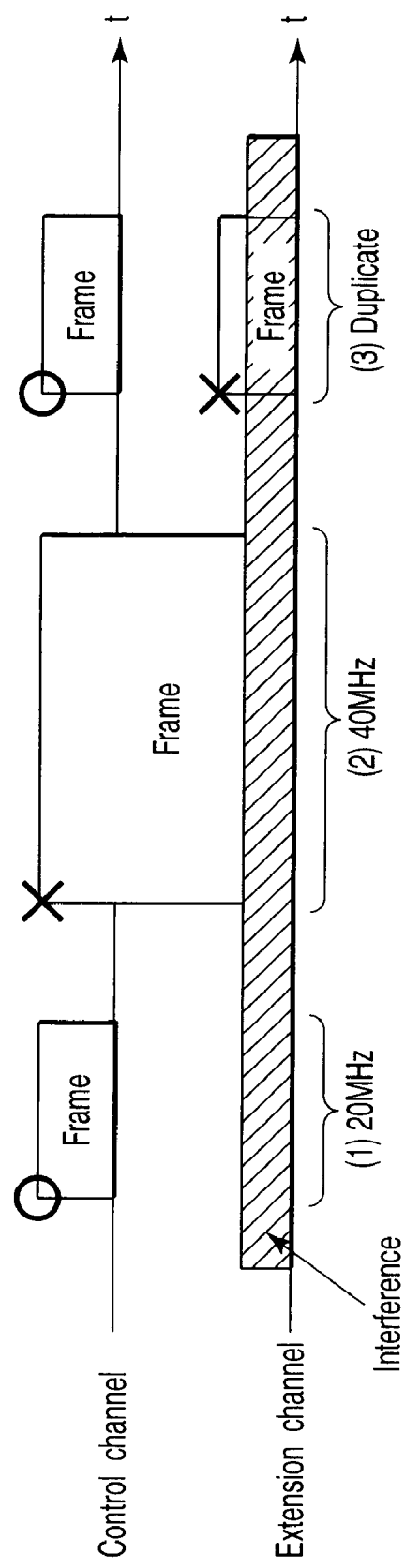
FIG. 7 is a view illustrating an aspect of a frame error in the case in which an influence exists in an extension channel.

FIG. 7 shows an aspect of an occurrence of a frame error (error) in the case in which an influence due to another system or BSS exists in the extension channel. Since the frame which has been transmitted through the control channel in the first channel width mode '20 MHz' is not affected by interference of the extension channel, even when any influence by other system and BSS exists in the extension channel, the reception terminal receives the frame without any frame error. Since in the frame which has been transmitted through the second channel width mode '40 MHz', a part of the frame is affected by an interference, if the interference level is large, the reception terminal receives the frame incorrectly. Meanwhile, in the third channel width mode 'Duplicate', since the transmission terminal transmits the 20 MHz frame independently in the control channel and the extension channel, if any interference exists in the extension channel, although the reception terminal may receive the 20 MHz frame of the control channel without any frame error, a frame error may be generated in the MHz frame in the extension channel. Some methods are possible approaches for the processing through the physical layer 500 in the case in which the reception terminal has received the frame in the third channel width mode 'Duplicate'. For instance, a method for transferring only the frame which has been received in the control channel to the MC layer 501, and a method for transferring the frame, in which the frame received though the control channel and the frame received through the extension channel are combined, to the MAC layer 501, is possible. When combining the frame which has been received through the control channel and the frame which has been received through the extension channel, the system may obtain a larger combined gain in comparison to the frame with only a single 20 MHz channel, and a less frame error occurs. That is, the frame which has been transmitted in the third channel with the third mode 'Duplicate' is received less incorrectly in comparison to the 20 MHz frame and the 40 MHz frame. The MAC layer 501 may receive the frame with a less frame error by using the way of transferring only the frames which have been received through the control channel to the MAC layer 501 if a large interference exists in the extension channel, the way of combining the frames which have been received in the control channel and in the extension channel, and then, transfers the frame, in which the synthesized gain has been obtained, to the MAC layer 501.

In other words, if the reception terminal may receive correctly the frames transmitted in the third channel width mode 'Duplicate', but the reception terminal may not receive correctly the frames transmitted in the second channel width mode '40 MHz', interference on the extension channel would cause the frame error, therefore, the system may estimate whether or not interference exists on the extension channel by checking the frame error rates in both the modes.

FIG. 8 shows an example of 40 MHz data frame transmission in IEEE802.11n. In IEEE802.11n, in the case of transmission of the data frames through the 40 MHz channel width, a control frame such as an RTS, a CTS and an ACK is transmitted in the third channel width mode 'Duplicate'. The transmission terminal makes two duplicates of the RTS, CTS and ACK frames which have a channel width of 20 MHz and simultaneously transmits them on both the control and extension channels.

The terminal transmits the RTS frame in the third channel width mode 'Duplicate' before transmitting data frame, and when receiving the CTS frame from the destination terminal, the terminal transmits the data frame through the 40 MHz channel width. On the other hand, when receiving the RTS frame in the third channel width mode 'Duplicate', the terminal transmits the CTS frame in the third channel width mode 'Duplicate', and receives the data frame through the 40 MHz channel width. The response frame like ACK or BA (Block ACK) for the data frame is transmitted in the third channel width mode 'Duplicate'.

Figure 9:
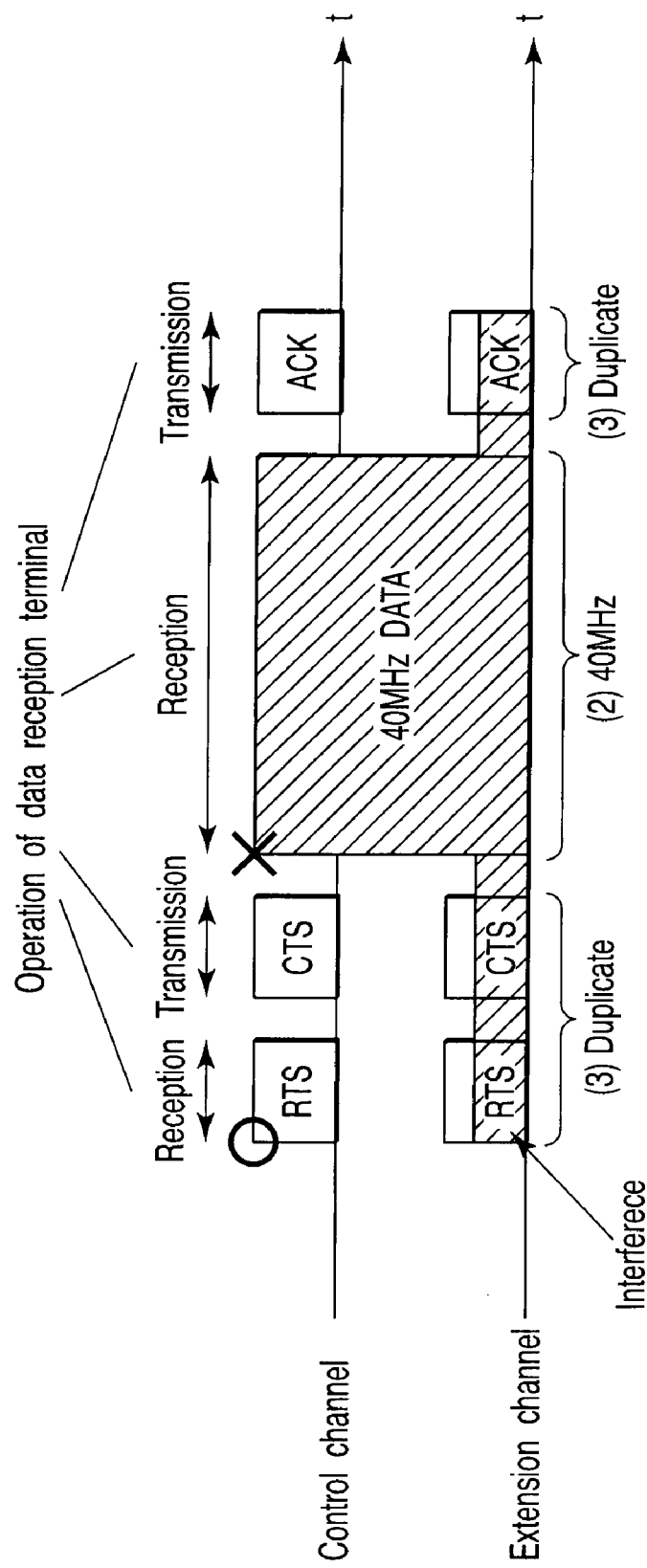
FIG. 9 is a view illustrating an aspect of transmissions of the 40 MHz data frame in the case in which the influence exists in the extension channel.

As depicted in FIG. 9, if there exists any interference caused by another system and BSS on the extension channel, the data reception terminal may receive the RTS frame to be transmitted in the third channel width mode 'Duplicate' without any frame error; however, more frame errors may be generated in the data frames to be transmitted in the 40 MHz channel width.

Returning to FIG. 5, the MAC layer 501 includes a reception frame analysis unit 508, a frame transmission instruction unit 509, a management frame generation unit 510 and a terminal information management table 511.

The analysis unit 508 gets a reception frame and reception channel width from the physical layer 500, checks the presence or absence of frame errors, and obtains a source address described at a header of a MAC frame. However, if any error is detected in the reception frame, the analysis unit 508 cannot get the source address from the header of the MAC frame. In this case, if the reception channel width of the frame from which the error has been detected is of 40 MHz channel width, the analysis unit 508 determines that the frame is the data frame, and assumes that the source address of the RTS frame or a CTS-self frame which has been received last as the source address of the 40 MHz data frame. Therefore, the analysis unit 508 checks a frame type described at the header of the MAC frame, and if the reception frame is a control frame such as an RTS frame or a CTS-self frame transmitted prior to the data transmission, the analysis unit 508 stores the source address obtained from the MAC header of the RTS frame or the CTS-self frame at least until the trailing data frame is completely received. As mentioned above, since it has higher possibility that the control frame to be transmitted in the third channel width mode 'Duplicate' may be received without any error in comparison to the data frame through the 40 MHz channel width, even if the data frame thorough the 40 MHz channel width contains a frame error, the source address could be gotten from the RTS frame and the CTS-self frame.

The analysis unit 508 writes the information about the source address, the reception channel width, and the presence or absence of the frame error in the management table 511 every one or several frame reception.

The table 511 receives the information of the source address, the reception channel width, and the presence or absence of the frame error from the analysis unit 508, and stores the presence or absence of the frame error as statistical information for each source address and for each reception channel width. The statistical information of the presence or absence of a frame error may be stored as a frame error rate. The statistical information of the presence or absence of a frame error may be continuously accumulated from the time of a BBS subscription, and may be updated at fixed time intervals, or a fixed number of frame receptions. Updating for every frame reception without accumulation is also a possible approach.

The frame transmission instruction unit 509 refers to the table 511, compares the frame error rate of the third channel width mode 'Duplicate' and a threshold 1 for each source address, and furthermore, compares the frame error rate of the 40 MHz channel width and a threshold 2. As a result, if the frame error rate of the third channel width mode 'Duplicate' is lower than the threshold 1, and the frame error rate of the 40 MHz channel width is higher than the threshold 2, the instruction unit 509 instructs the management frame generation unit 510 to transmit the recommended channel width notification frame with 'use only 20 MHz' described therein to the corresponding-source address.

Or, the instruction unit 509 calculates the frequency by which the frame error rate in the third channel width mode 'Duplicate' becomes lower than the threshold 1 and the frame error rate in the 40 MHz channel width becomes higher than the threshold 2, and stores the calculated frequency as statistical information. Then, when the occurrence frequency, in which "the frame error in the third channel width mode 'Duplicate' becomes lower than the threshold 1 and the frame error rate in the 40 MHz channel width becomes higher than the threshold 2", is equal to a prescribed threshold 3 or more, the instruction unit 509 may instruct a management frame generation unit 1007 to transmit the recommended channel width notification frame with 'use only 20 MHz' described therein to the corresponding-source address.

It is appropriate to fulfill a relationship of 'threshold 1≦threshold 2' between the thresholds 1 and 2, but it is not always necessary. The MAC layer 501 may set the thresholds 1 and 2 to values according to the situation, or may select appropriate values from among the prescribed values in response to the situation. Or, they may always be fixed values.

If it is assumed that 'threshold 1≦threshold 2' is fulfilled, and if "the frame error rate in the third channel width mode 'Duplicate' is lower than threshold 1, and the frame error rate of the 40 MHz channel width is higher than the threshold 2", the relationship of "frame error rate of the third channel width mode 'Duplicate'<frame error rate of 40 MHz channel width" is fulfilled. In other words, it may be assumed that the reception terminal is in a situation in which "the reception terminal may receive the frame in the third channel width mode 'Duplicate', but it cannot receive the frame in the 40 MHz channel width", and that there exists an occurrence of an interference on the extension channel. If the level of interference caused by another system or wireless LAN on the extension channel is high, the reception terminal may be able to receive frames correctly in not the 40 MHz channel width but in the 20 MHz channel width. Therefore, to instruct the source terminal to transmit the frames not through the 40 MHz channel width but through the 20 MHz channel width, the instruction unit 509 issues the transmission instruction of the recommended channel width notification frame recommending the use of the MHz channel width to the generation unit 510.

When receiving the transmission instruction of the recommended channel width notification frame recommending the 20 MHz channel width from the instruction unit 509, the generation unit 510 generates the recommended channel width notification frame with 'use only 20 MHz' described therein and transmits it to the specified address.

As mentioned above, each terminal estimates the presence or absence of interference on the extension channel by checking the frame error rate in the third channel width mode 'Duplicate' and in the 40 MHz reception frames, and if it is determined that interference is present on the extension channel, each terminal notifies to use the 20 MHz channel width to other terminals. Thereby, it decreases wastage of the channel of the whole of the BSS and wastage of the transmission power by avoiding the transmissions of 40 MHz frames when it is considered a high possibility to fail to receive 40 MHz frame.

A part of the foregoing constituent elements may be achieved as a radio communication program which makes a computer execute a prescribed procedure. The communication program is stored in a program storage device in the computer. The storage device includes, for example, a non-volatile semiconductor storage device and a magnetic disk device. The communication program is read into a random access memory (RAM) by control from a CPU (not shown) and executed by the CPU.

SECOND EMBODIMENT

While the aforementioned first embodiment has described the example of notifying the recommended channel width by using the recommended channel width notification frame, the second embodiment will describe an example of notifying the recommended channel width by using a 'recommended transmission channel width field' (hereinafter referred to as a 'recommended channel width notification field' of a management frame.

The system configurations, channel arrangements, frame transmission systems, aspects of frame error occurrences, configurations of radio communication apparatuses, etc., shown from FIG. 1 to FIG. 9 apply similarly to the second embodiment.

As mentioned in the first embodiment, in the self-BSS of FIG. 3, when transmitting a data frame, the AP, STA1 and STA5 decide the transmission channel width in accordance with the recommended channel width of the destination terminal. Each terminal notifies the recommended channel width to other terminals other than the self-terminal.

To notify the recommended channel width, the second embodiment may use not only 'a recommended channel width notification frame' but also a 'recommended channel width field' of an additional HT information element prepared as an information element of the management frame. This field is one so as to notify the channel width (20 MHz or 40 MHz) desired to be used in data transmission to the self-terminal, in the same way as a 'recommended channel width notification frame'. The frame describes either information of 'use only 20 MHz' or 'may use either channel width of 20 MHz or 40 MHz' therein.

The 'recommended channel width notification field' is added to the management frame, such as a Beacon frame, a probe Response frame, or an Association Response frame, to be transmitted from the AP. Accordingly, when the AP specifies the recommended channel width to the STAs that are the AP's followers, the AP may use both the 'recommended channel width notification frame' and the 'recommended channel width notification field'; however, when the STA specifies the recommended channel width to other STAs or the AP, the STA uses only the 'recommended channel width notification frame'.

When using the 'recommended channel width notification frame', the same recommended channel width may be notified to all of other terminals by using broadcast transmissions, or different recommended channel widths may be notified to other terminals by using unicast transmissions for each terminal. When using the 'recommended channel width notification field' of the management frame, the STA depends on frame types. The Beacon frame is transmitted through the broadcast, and the Probe Response frame and the Association Response frame are transmitted through the unicast.

If the AP individually notifies different recommended channel widths by the 'recommended channel width frame' to the STAs in the BSS, when describing the recommended channel width in the 'recommended channel width notification field' in the Beacon frame to broadcast it, the recommended channel width set for each STA is updated, and the identical recommended channel widths are set for all the STAs.

Therefore, since the individual setting of the recommended channel widths by means of the recommended channel width notification frames is obviated, when the recommended channel width is specified to the STA by using the recommended channel width frame, the AP does not describe anything in the 'recommended channel width notification field' of the Beacon frame.

Or, on the STA side, although the recommended channel width is set by the recommended channel width frame from the AP, if the recommended channel width is described in the 'recommended channel width field' of the Beacon frame, a method of preferentially setting the recommended channel width notified by means of the recommended channel width frame is a possible approach.

To set the identical recommended channel widths for all the STAs in the BSS, the AP may use the 'recommended channel wild notification field' of the Beacon frame. Especially, if the AP includes an interference detection means of the extension channel, and when it is determined that interference is present on the extension channel, using the 20 MHz channel width for all the STAs in the BSS may be recommended by broadcasting the Beacon frame which describes the 'use only 20 MHz' in its recommended channel width notification field.

THIRD EMBODIMENT

While the foregoing first embodiment has described the example of transmitting the recommended channel width notification frame on the basis of the presence or absence of interference on the extension channel estimated from the frame error rate of the frame in the third channel width mode 'Duplicate' and the frame error rate of the 40 MHz reception frame, in the third embodiment, an example of comparing the transmission channel width of a frame so as to transmit from a self-terminal to a destination terminal with a reception channel width of a frame to be transmitted from the destination terminal to the self-terminal, and transmitting a recommended channel width notification frame on the basis of the comparison result will be described.

The system configurations and channel arrangements depicted in FIGS. 1 to 4 given in the first embodiment apply similarly to the third embodiment.

Figure 10:
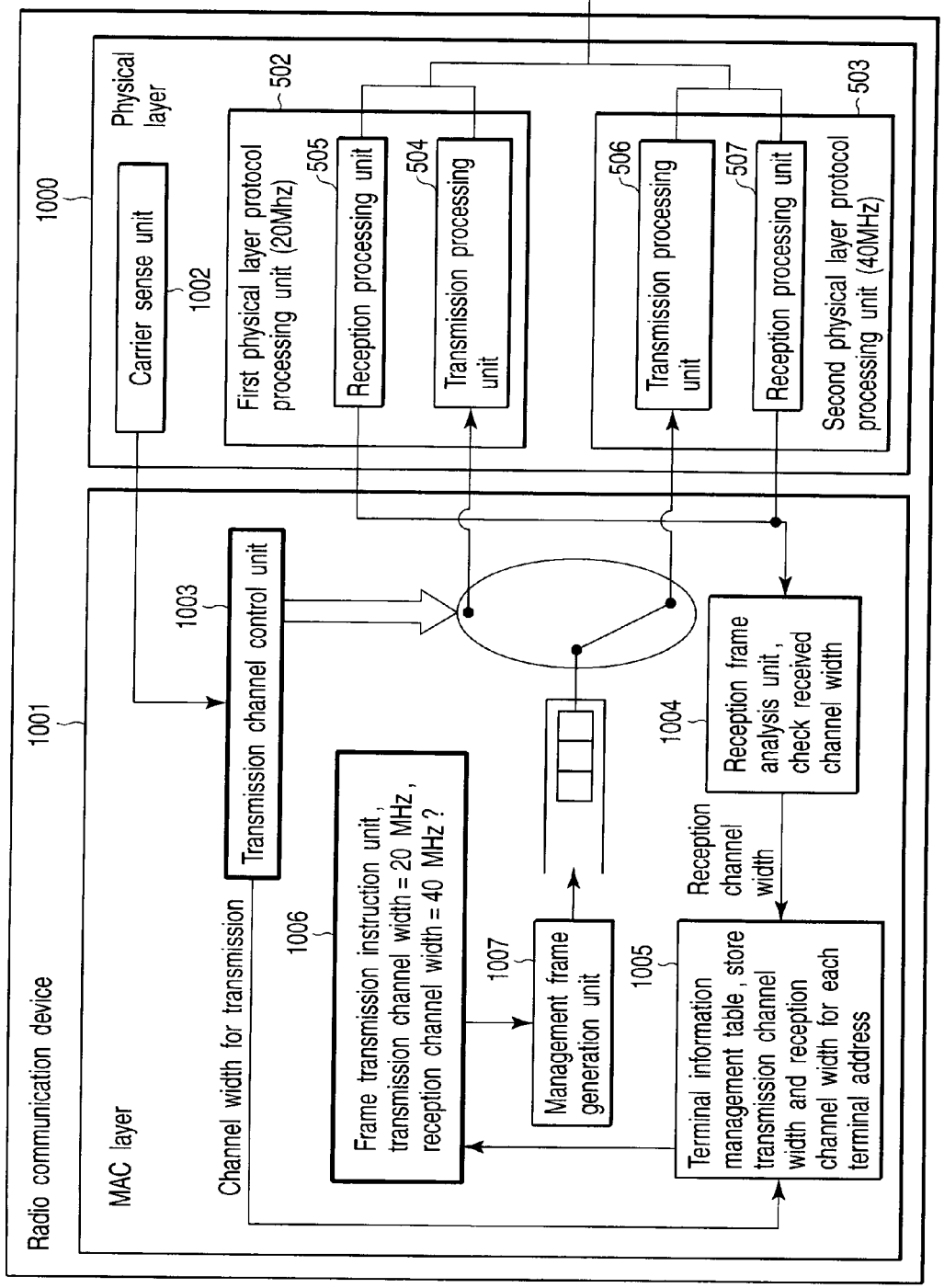
FIG. 10 is a block diagram illustrating a radio communication apparatus regarding the third embodiment.

FIG. 10 shows a block diagram of a radio communication apparatus regarding the third embodiment, wherein the radio communication apparatus depicted in FIG. 10 is assumed as a 20/40 MHz AP or a 20/40 MHz STA. The 20/40 MHz AP and the 20/40 MHz STA, as shown in FIG. 10, each include a physical layer 1000 and a MAC layer 1001.

The physical layer 1000 includes a first physical layer protocol processing unit 502 performing physical protocol processing so as to make communication using a first channel with a first communication channel width; a second physical layer protocol processing unit 503 performing physical layer protocol processing so as to make communication using a second channel with a second communication channel width, which is wider than that of the first communication channel; and a carrier sense unit 1002 measuring busy/idle information of the first and second channels.

The first processing unit 502 and the second processing unit 503 are the same as those of the first embodiment.

When detecting reception power, the carrier sense unit 1002 compares the reception signal strength to a threshold, and determines whether or not carriers are detected (busy or idle) in a control channel, an extension channel and a 40 MHz channel. If the signal strength is stronger than the threshold, the carrier sense unit 1002 determines that those channels are busy, and if not, it determines that those channels are idle. To avoid the effect of noise for a short while, a reception signal strength averaged for a certain fixed time period may be performed. The MAC layer 1001 may set the threshold in the carrier sense unit 1002 as a value corresponding to a situation (occurrence situation of interference in a certain environment). Or, the threshold may be appropriately selected from the preset values in response to the situation, and may always be a fixed value. The carrier sense unit 1002 notifies the carrier sense result to a transmission channel control unit 1003 in the MAC layer 1001.

The carrier sense unit 1002 may apply the threshold as described hereinafter in addition to the foregoing operations. Such operations include, based on the reception signal assumed as being at least a part of a physical header, applying a threshold to a reception signal determined as a significant signal, and applying a threshold to signals other than the significant signal that are determined to be insignificant signals". The operations are defined in a paragraph such as a "CCA", "CCA Sensitivity" and "Receive PLCP" in IEEE802.11a. In many cases, a carrier sense for a significant signal is set with higher sensitivity (threshold) than that for an insignificant signal. For instance, in the case of IEEE802.11a, the sensitivity of the significant signal of the 20 MHz channel is defined as −82 dBm, and that of the insignificant signal thereof is defined as −62 dBm.

To detect the significant signal in the extension channel; however, it is needed for the radio communication apparatus to detect physical frames in the extension channel and to include a function of detecting the physical frames in the extension channel and decoding at least a part of a physical header. However, from a viewpoint of a device cost and actual circumstances, the function is eliminated sometimes. Therefore, with respect to the carrier sense of the extension channel, the communication apparatus may conduct only energy measurement of a reception signal without detecting the physical header from the reception signal.

The MAC layer 1001 includes a transmission channel control unit 1003, a reception frame analysis unit 1004, a terminal information management table 1005, a frame transmission instruction unit 1006, and a management frame generation unit 1007.

If the frame transmission through the transmission channel width of 40 MHz is scheduled, the control unit 1003 implements a carrier sense in the control channel and the extension channel. As the carrier sense result, if both the channels are idle, the control unit 1003 transmits the frame though the transmission channel width of 40 MHz in accordance with the schedule, and if the control channel is idle but the extension channel is busy, the control unit 1003 uses only the control channel through the transmission channel width of 20 MHz to transmit frames. As regards the procedure of the carrier sense and a determining method of busy/idle in the control channel and the extension channel, various patterns are possible approaches; however it is our intention that the determining methods are not limited to a specific method.

After deciding the transmission channel width to be actually used for the frame transmission in response to the result of the carrier sense, the control unit 1003 notifies the transmission channel width (20 MHz or 40 MHz) and the destination address to the management table 1005.

The analysis unit 1004 receives the reception frame main body and the reception channel width of the frame from the physical layer 1000, checks the frame type described at the header of the MAC frame, and obtains the source address. If the frame type of the reception frame is data, the analysis unit 1004 notifies the source address and the reception channel width to the table 1005.

The table 1005 stores the transmission channel width notified from the control unit 1003 and the reception channel width notified from the analysis unit 1004 for each destination address. The control unit 1003 notifies the transmission channel width and the destination address for each frame transmission. The analysis unit 1004 notifies the reception channel width and the source address for each frame reception. Both the transmission channel width and the reception channel width of several frames, from the newest one, are stored for each destination address. For instance, the table 1005 may store the latest one frame, or may store one hundred frames. Or, the table 1005 may be periodically flushed. For instance, the table 1005 may be flushed at one beacon intervals to newly record frames.

The instruction unit 1006 periodically refers to the table 1005 and compares the transmission channel width to the reception channel width for each terminal address. The instruction unit 1006 calculates the ratio (frequency) in which the transmission channel width and the reception channel width are 20 MHz and 40 MHz, respectively, for each terminal address, and if the ratio in which the transmission channel width is 40 MHz is equal to the threshold 1 or less and if the ratio in which the reception channel width is 40 MHz is equal to the threshold 2 or more, the instruction unit 1006 instructs the generation unit 1007 to transmit the recommended channel width notification frame with 'use only 20 MHz' described therein to the corresponding-terminal address.

Alternatively, the instruction unit 1006 may calculate the frequency in which the transmission channel width is 20 MHz, equaling the threshold 1 or less and of the ratio, and the frequency, in which the reception channel width is 40 MHz, equaling the threshold 2 or more, then store such frequencies as statistical information. If the frequency of the ratio is equal to the prescribed threshold 3 or more, the instruction unit 1006 may instruct the generation unit 1007 to transmit the recommended channel width a notification frame with 'use only 20 MHz' described therein to the corresponding-terminal address.

It is appropriate for the thresholds 1 and 2 to fulfill a relationship of 'thread 1≦thread 2'; however other relationships may be acceptable. The MAC layer 1001 may set values of the thresholds 1 and 2 according to the situation. Appropriate values may be selected from among the preset values in response to the situation. Or the values may always be fixed values.

The instruction unit 1006 and the table 1005 need not be independent from each other and may be united. Alternatively, the instruction unit 1006 may include the table 1005 therein.

When receiving the transmission instruction of the recommended channel width notification frame which recommends the 20 MHz channel width from the instruction unit 1006, the generation unit 1007 generates the recommended channel width notification frame with 'use only 20 MHz' described therein and transmits it to a specified address.

As mentioned above, even when the radio communication apparatus is in a situation in which the carrier sense of the self-terminal detects interference in the extension channel and the transmission channel width becomes 20 MHz, the communication apparatus may detect the situation in which the frames are transmitted from the partner terminal through the transmission channel width of 40 MHz by comparing the transmission channel width with the reception channel width.

Although the data reception terminal is in a situation incapable of receiving a 40 MHz frame, the device may prevent the data transmission terminal from keeping the transmissions of the 40 MHz frames and may obtain the same effect as that of the first embodiment by specifying the transmission channel width from the data reception terminal to the data transmission terminal on the basis of the detection result.

FOURTH EMBODIMENT

In the fourth embodiment, an example in which a radio communication apparatus transmits frames in response to a capability of a partner terminal will be described. Hereinafter, with respect to the capability of the partner terminal, for example, a carrier sense method will be described. More specifically, the information concerning whether or not the partner terminal has a carrier sense function of the extension channel includes the capability thereof. Even when notifying the recommended channel width by using the 'recommended channel width notification field' as shown in the second embodiment instead of the transmission of the 'recommended channel width notification field', the fourth embodiment is applicable.

The system configurations and the channel arrangements shown in FIGS. 1 to 4 described for the first embodiment may also apply to the fourth embodiment similarly.

Figure 11:
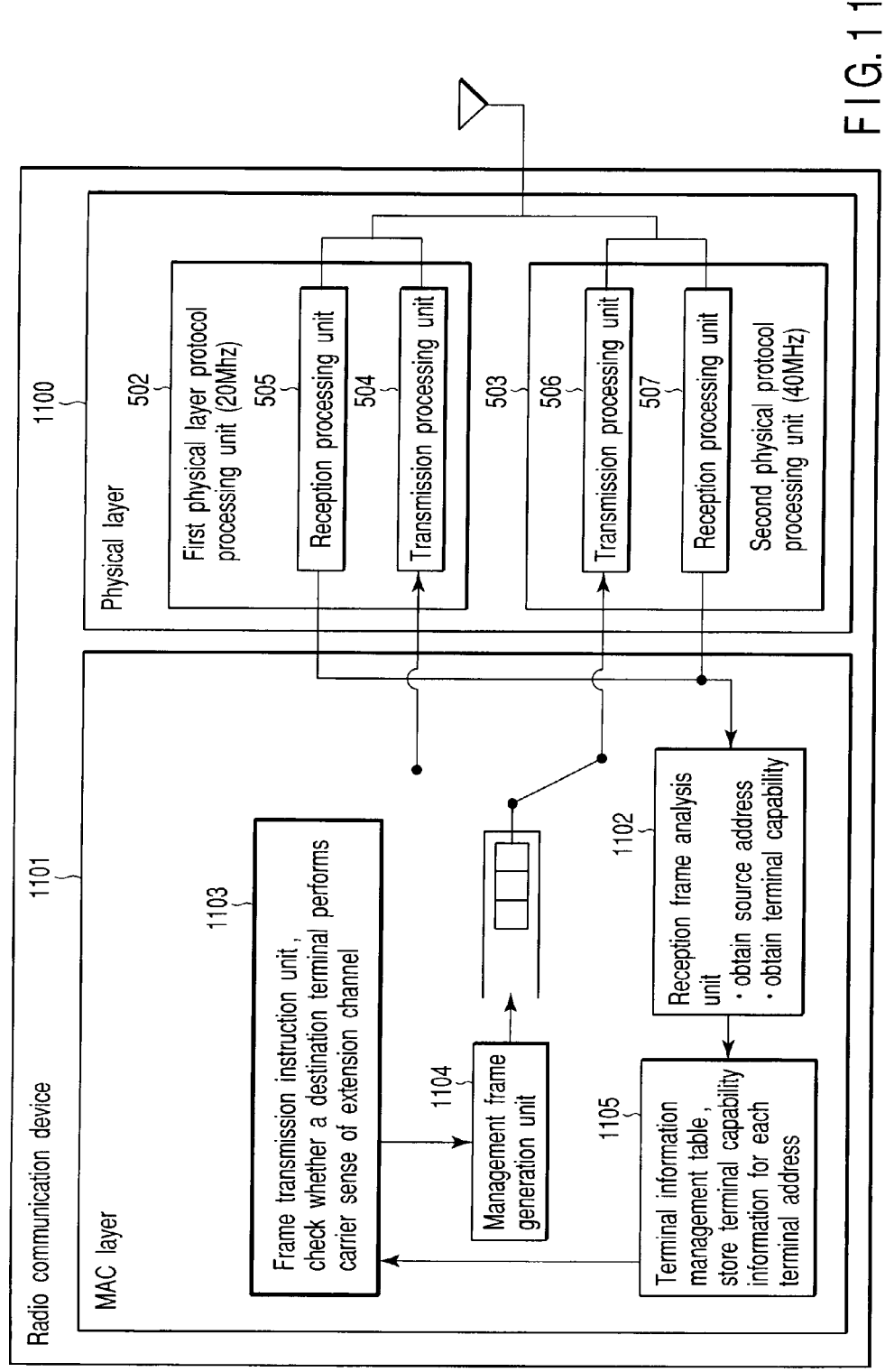
FIG. 11 is a block diagram illustrating a radio communication apparatus regarding the fourth embodiment.

FIG. 11 shows a block diagram of a radio communication apparatus regarding the fourth embodiment. The device depicted in FIG. 11 is a 20/40 MHz AP. The 20/40 MHz AP includes a physical layer 1100 and a MAC layer 1101, as depicted in FIG. 11.

The physical layer 1100 includes a first physical protocol processing unit 502 that performs physical layer protocol processing so as to make communication through a first channel with a first communication channel width; and a protocol processing unit 503 that performs physical layer protocol processing so as to make communication through a second channel with a second communication channel of which the width is wider than that of the first communication channel. The first processing unit 502 and the second protocol unit 503 apply the same processes as those of the first embodiment.

The MAC layer 1101 includes a reception frame analysis unit 1102, a frame transmission instruction unit 1103, a management frame generation unit 1104 and a terminal information management table 1105.

The analysis unit 1102 obtains the source address described at the header of the MAC frame in the frame received from the physical layer 1100, and if the presence or absence of the carrier sense function of the extension channel is described therein, the analysis unit 1102 obtains the information on the description. If the presence or absence of a carrier sense of the extension channel is described in an AP search frame or a subscription request frame to be transmitted from a STA which is desired to be newly subscribed in the BSS, the analysis unit 1102 obtains the information of the description. The analysis unit 1102 writes the obtained information into the management table 1105.

The table 1105 receives the source address, and the presence or absence of the carrier sense function of the extension channel from the analysis unit 1102, and stores the presence or absence of the carrier sense function of the extension channel for each source address.

The instruction unit 1103 refers to the table 1105 and instructs the generation unit 1104 so as to transmit the recommended channel width notification frame with the 'use only 20 MHz' described therein toward the terminals not having the carrier sense functions of the extension channel.

Alternatively, the instruction unit 1103 may refer to the table 1105 to determine manufacturing companies and types of models of the corresponding-terminals on the basis of the MAC address of each terminal. If the terminals are ones which do not have the carrier sense functions of the extension channel, the instruction unit 1103 instructs the generation unit 1104 so as to transmit the recommended channel width notification frames with the 'use only 20 MHz' to the corresponding-terminals.

When receiving the transmission instruction of the recommended channel width notification frame recommending the 20 MHz channel width from the instruction unit 1103, the generation unit 1104 generates the recommended channel width notification frame with the 'use only 20 MHz' described therein to transmit it to the specified address.

Thus, by notifying the use of the 20 MHz channel width to the terminals not having the carrier sense functions of the extension channel, the device prevents the terminals not having the carrier sense function of the extension channel from transmitting the 40 MHz frames, and avoids frame collisions with other BSSs overlapped on the extension channel resulting from not performing the carrier senses of the extension channel. Thereby, the device may prevent throughput deterioration, and wastage of transmission power of the transmission terminals.

While the fourth embodiment has described the 20/40 MHz AP by way of example, a 20/40 MHz STA may similarly specify the transmission channel width in response to the abilities of other terminals. However, in the case of the 20/40 MHz STA, to acquire the capability information of other terminals, a means to takeover Association frames to be transmitted from other terminals to the AP, and a means to be informed of the information about other terminals from the AP are needed.

FIFTH EMBODIMENT

In the fifth embodiment, an example which transmits a recommended channel width notification frame in response to carrier sense information of the self-terminal will be described. The fifth invention is applicable to the case in which a radio communication terminal notifies a recommended channel width by using the 'recommended channel width notification field' as shown in the second embodiment instead of transmission of the 'recommended channel width notification frame'.

The system configurations and the channel arrangements shown in FIGS. 1 to 4 described in the first embodiment are the same in the fifth embodiment.

Figure 12:
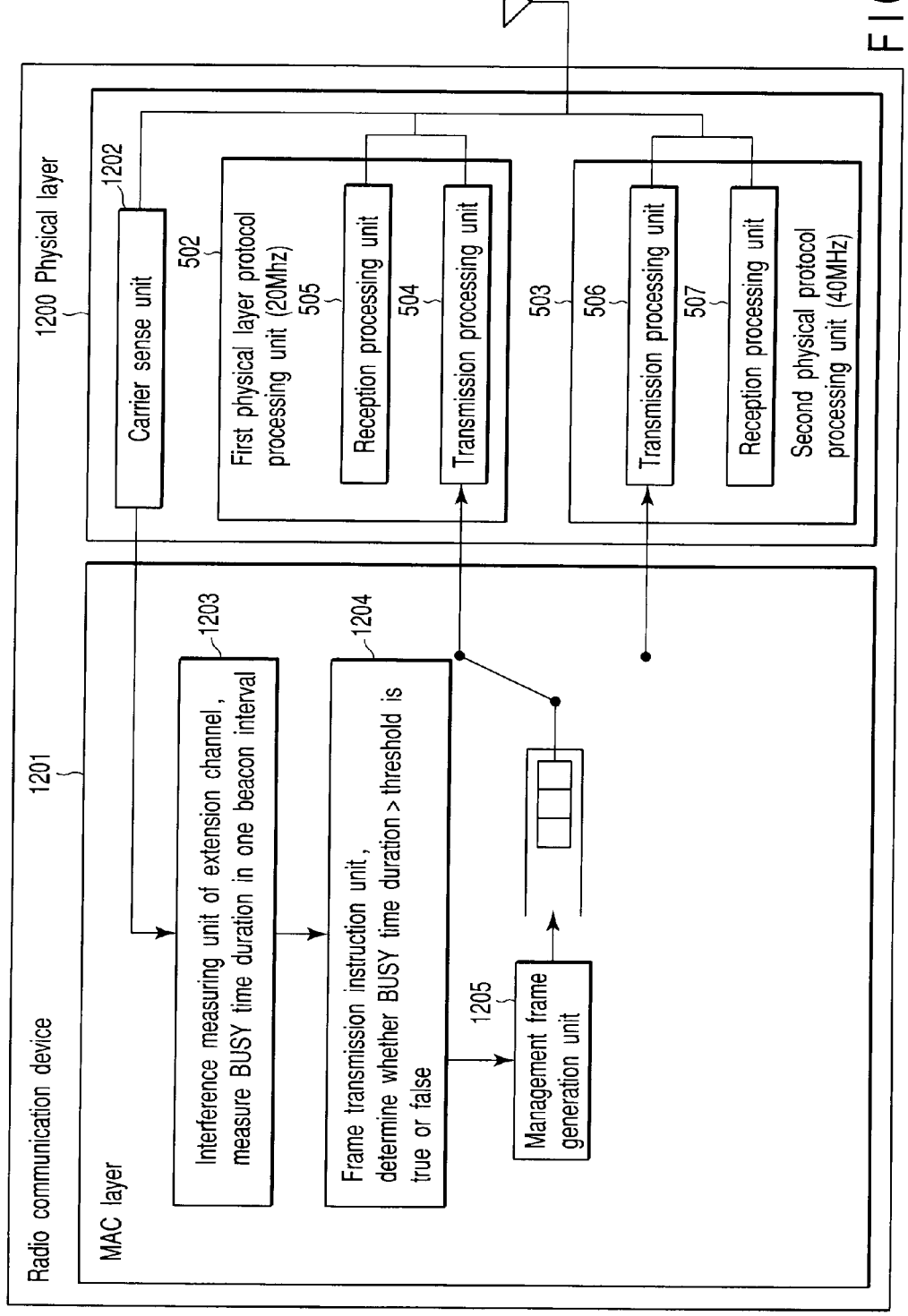
FIG. 12 is a block diagram illustrating a radio communication apparatus regarding the fifth embodiment.

FIG. 12 shows a block diagram of a radio communication apparatus regarding the fifth embodiment. Here, the radio communication apparatus shown in FIG. 12 is a 20/40 MHz AP. The 20/40 MHz AP includes a physical layer 1200 and a MAC layer 1201, as shown in FIG. 12.

The physical layer 1200 includes a first physical layer protocol processing unit 502 that performs physical layer protocol processing so as to make communication by using a first channel with a first communication channel width; a second first physical layer protocol processing unit 503 that performs physical layer protocol processing so as to make communication by using a second channel with a second communication channel width; and a carrier sense unit 1202.

The first processing unit 502 and the second processing unit 503 are the same as those of the first embodiment. When detecting reception power, the carrier sense unit 1202 compares the reception signal strength with a threshold, and determines an idle/busy state, namely whether or not carriers are detected (busy or idle) in a control channel, an extension channel and a 40 MHz channel width. If the reception signal strength is stronger than the threshold, it is determined as a busy state, and if the strength is weaker than the threshold, it is determined as an idle state. To avoid the effect of noise for a short while, a reception signal strength averaged for a certain fixed time period may be used. As for the threshold, the MAC layer 1201 may set a value corresponding to a situation (occurrence situation of interference in a certain environment) for the carrier sense unit 1202, or may select an appropriate value from among preset values in response to the situation, or may always be set to a fixed value. The carrier sense unit 1202 notifies the idle/busy state to an interference measuring unit 1203 in the MAC layer 1201.

The carrier sense unit 1202 of the physical layer 1200 may apply a threshold as described hereinafter in addition to the foregoing operations. Such operations include, based on the reception signal assumed as being at least a part of a physical header, applying a threshold to a reception signal determined as a significant signal, and applying a threshold to signals other than the significant signal that are determined to be insignificant signals. This operation is defined, for example, in a paragraph such as "CCA", "CCA Sensitivity" and "Receive PLCP" in IEEE802.11a. In many cases, as regards the carrier sense to the significant signal, sensitivity (threshold) is set higher than that to the insignificant signal. For instance, in the case of IEEE802.11a, the sensitivity of the significant signal of the 20 MHz channel width is defined as −82 dBm, and the sensitivity of the insignificant signal thereof is defined as −62 dBm.

However, to detect the significant signal in the extension channel, it is necessary for the radio communication apparatus to have a function for detecting physical frames in the extension channel and decoding at least a part of a physical header, but from a viewpoint of device cost and practicality, this function may be eliminated. Therefore, with respect to the carrier sense of the extension channel, the carrier sense unit 1202 may conduct only energy measurement of the reception signal without having to detect the physical header from the reception signal.

The carrier sense units 1202 in the physical layer 1200 each use a 20 MHz filter and a 40 MHz filter for the signal strength measurement for the 20 MHz channel width and the 40 MHz channel width, respectively. For performing the measurement of the signal strength in the control channel and the extension channel, the carrier sense unit 1202 may use one 20 MHz filter and perform switching for the control channel or the extension channel. Alternatively, the carrier sense unit 1202 may assign independent 20 MHz filters to the control channel and the extension channel, respectively. The carrier sense unit 1202 may use the difference between the signal strength which has been measured with the 20 MHz filter of the control channel and the signal strength which has been measured with the 40 MHz filter as the signal strength of the extension channel. In contrast, the carrier sense unit 1202 may sum the signal strength which has been obtained with the 20 MHz filters for the control channel and for the extension channel and may set the sum as the signal strength of the 40 MHz channel width. In the case of a configuration that uses a plurality of antennas simultaneously, such as a MIMO, signals are input from each A-D converter to each filter. The reception signal strengths of the plurality of antennas are appropriately summed to be set as the reception signal strength in each channel. However, to reduce power consumption, the carrier sense unit 1202 may measure the reception signal strength only at a single antenna. The filter is used with a view to be actualized by digital processing, but the filter may be actualized by analog processing.

The MAC layer 1201 includes an interference measuring unit 1203 of the extension channel, a frame transmission instruction unit 1204 and a management frame generation unit 1205.

The measuring unit 1203 measures the level of interference in the extension channel. As for an index to measure the level of interference, an interference signal strength, interference reception time, or interference reception reliability of the extension channel, the number of terminals of other BSSs and systems using the extension channel, etc., are possible approaches. In the fifth embodiment, for example, the interference reception time of the extension channel may be used. The measuring unit 1203 obtains the idle/busy state of the extension channel from the carrier sense unit 1202 in the physical layer 1200.

The measuring unit 1203 measures the interference reception time of the extension channel. For instance, the measuring unit 1203 may store the length of time in which the state of the extension channel has been busy as statistical information within one beacon interval on the basis of the idle/busy state of the extension channel obtained from the carrier sense unit 1202 in the physical layer 1200. Alternatively, the measuring unit 1203 may measure the length of time in which the 40 MHz channel width and the control channel are each busy in one beacon interval on the basis of the idle/busy states of the 40 MHz channel width and the control channel obtained from the carrier sense unit 1202 in the physical layer 1200, and may assume that the difference given by subtracting the busy time length of the 40 MHz channel from the busy time length of the control channel as the busy time length of the extension channel, and may store such time. When the self-radio communication apparatus intends to transmit 40 MHz frames, the carrier sense unit 1202 performs the carrier sense of the 40 MHz channel width, and the measuring unit 1203 may measure a possibility in which the carrier sense unit 1202 in the physical layer 1200 has detected the busy state of the extension channel as the statistical information and may use it. The possibility of the busy state of the 40 MHz channel width not of the extension channel may also be used.

The measuring unit 1203 notifies the interference reception time of the aforementioned extension channel to the frame transmission instruction unit 1204.

The instruction unit 1204 compares the interference reception time of the extension channel obtained from the measuring unit 1203 of the extension channel with a prescribed threshold, and if the interference reception time is longer than the threshold, the instruction unit 1204 instructs the management frame generation unit 1205 so as to transmit the recommended channel width notification frame with 'use only 20 MHz' described therein to other terminals.

When receiving the transmission instruction of the recommended channel width notification frame that recommends the 20 MHz channel width from the instruction unit 1204, the generation unit 1205 generates the recommended channel width notification frame with 'use only 20 MHz' described therein and transmits it to the specified address.

Thus, in the case of a high level of interference in the extension channel, by instructing other terminals to use the 20 MHz channel width, the radio communication apparatus avoids a frame collision with other BSSs overlapping on the extension channel. Thereby, the radio communication apparatus may prevent deterioration in throughput and wastage of transmission power of the terminals.

While the embodiments of the invention have been described by giving the example of the 20/40 MHz AP, the case of the 20/40 MHz STA may similarly specify the transmission channel width in response to the abilities of other terminals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus that performs first radio communication using one first channel having a first channel width, and second radio communication using a second channel having a second channel width that is wider than the first channel width and also having a channel width overlapping with the one first channel and another first channel having the first channel width, wherein the apparatus belongs to a basic service set (BSS) in which the apparatus is allowed to perform the first radio communication and the second radio communication, comprising:

an interference detection device configured to detect that interference occurs in the another first channel;

a frame generation unit which generates a notification frame that recommends the use of only the one first channel;

an instruction unit which instructs the frame generation unit to generate the notification frame when the occurrence of interference in the another first channel is detected by the interference detection device; and a frame transmission unit which transmits the notification frame generated from the frame generation unit in response to the instruction from the instruction unit, wherein when receiving two first frames which have been each transmitted through the first channel width by simultaneously using the two first channels and the contents are mutually the same, if a first frame error rate of one of the two first frames is lower than a first threshold and a second frame error rate of a second frame, which has been transmitted through the second channel width by using the second channel in succession to the two first frames, is higher than a second threshold, the interference detection device determines that interference has occurred in the another first channel among the two first channels.

2. The apparatus according to claim 1, further comprising:
a storage device to store information showing which of the first channel width and the second channel width is used by a carrier sense in transmitting a frame, and information showing which of the first channel width and the second channel width is a reception channel width of a received frame, wherein the interference detection device determines that interference has occurred in the another first channel when a usage rate of the first channel width in transmitting the frame is higher than a third threshold and a usage rate of the second channel width in receiving the frame is higher than a fourth threshold.

3. The apparatus according to claim 1, further comprising:
a carrier sense unit which determines a busy or idle state of the two first channels or the second channel; and a storage device to store a carrier sense result from the carrier sense unit, wherein the interference detection device determines that a busy time which has been measured by the carrier sense unit is longer than a third threshold on the basis of the carrier sense result, and in this case, the interference detection device determines that interference has occurred in one first channel among the two first channels.

4. The apparatus according to claim 1, wherein the interference determining device determines that interference has occurred in a first channel among the two first channels when a frequency, in which the first frame error rate becomes lower than the first threshold and the second frame error rate becomes higher than the second threshold, becomes higher than a third threshold.

5. The apparatus according to claim 2, wherein the interference determining device determines that interference has occurred in a first channel among the two first channels when a frequency, in which a ratio of using the first channel width in transmitting the frame becomes higher than a third threshold and a ratio of using the second channel width in receiving the frame becomes higher than a fourth threshold, becomes higher than a fifth threshold.

6. The apparatus according to claim 1, wherein the notification frame is composed of a management frame including a recommended channel width notification field which recommends using only the first channel width.

7. An apparatus which performs first radio communication using one first channel having a first channel width, and second radio communication using a second channel having a second channel width that is wider than the first channel width and also having a channel width overlapping with the one first channel and another first channel having the first channel width, wherein the apparatus belongs to a basic service set (BSS) in which the apparatus is allowed to perform the first radio communication and the second radio communication, comprising:
an obtaining device configured to obtain terminal capability information showing whether a partner terminal is configured to perform a carrier sense of the another first channel;
a frame generation unit which generates a notification frame to recommend using only the first channel;
an instruction unit which instructs the frame generation unit to generate the notification frame when the terminal capability information, showing the fact that it is impossible for the carrier sense of the another first channel to be done, is obtained from the obtaining device;
a frame transmission unit which transmits the notification frame generated from the frame generation unit to the partner terminal in response to an instruction from the instruction unit; and
wherein when receiving two first frames which have been each transmitted through the first channel width by simultaneously using the two first channels and the contents are mutually the same, if a first frame error rate of one of the two first frames is lower than a first threshold and a second frame error rate of a second frame, which has been transmitted through the second channel width by using the second channel in succession to the two first frames, is higher than a second threshold, an interference detection device determines that interference has occurred in the another first channel among the two first channels.

8. A radio communication method implemented by a computer programmed as a radio communication apparatus for performing first radio communication using one first channel having a first channel width, and second radio communication using a second channel having a second channel width that is wider than the first channel width and also having a channel width overlapping with the one first channel, and another first channel having the first channel width, wherein the apparatus belongs to a basic service set (BSS) in which the apparatus is allowed to perform the first radio communication and the second radio communication, the method comprising:
detecting that interference has occurred in the another first channel;
generating, in the radio communication apparatus, a notification frame to recommend using only the one first channel when the detecting detects the occurrence of interference in the another first channel;
transmitting the notification frame generated from the generating of the notification frame; and
wherein when receiving two first frames which have been each transmitted through the first channel width by simultaneously using the two first channels and the contents are mutually the same, if a first frame error rate of one of the two first frames is lower than a first threshold and a second frame error rate of a second frame, which has been transmitted through the second channel width by using the second channel in succession to the two first frames, is higher than a second threshold, determining, by an interference detection device, interference has occurred in the another first channel among the two first channels.

9. A radio communication method implemented by a processor of a computer programmed as a radio communication apparatus for performing first radio communication using one first channel having a first channel width, and second radio communication using a second channel having a second channel width that is wider than the first channel width and also having a channel width overlapping with the one first channel and another first channel having the first channel width, wherein the apparatus belongs to a basic service set (BSS) in which the apparatus is allowed to perform the first radio communication and the second radio communication, the method comprising:
obtaining terminal capability information showing whether a partner terminal is configured to perform a carrier sense of the another first channel;
generating, in the radio communication apparatus, a notification frame to recommend using only the first channel width when the terminal capability information shows that it is impossible to perform the carrier sense on the another first channel;
transmitting the notification frame to the partner terminal;
wherein when receiving two first frames which have been each transmitted through the first channel width by simultaneously using the two first channels and the contents are mutually the same, if a first frame error rate of one of the two first frames is lower than a first threshold and a second frame error rate of a second frame, which has been transmitted through the second channel width by using the second channel in succession to the two first frames, is higher than a second threshold, determining, by an interference detection device, interference has occurred in the another first channel among the two first channels.

* * * * *